July 18, 1939.  G. R. G. GATES  2,166,586
SERVO-BRAKE MECHANISM FOR VEHICLES AND THE LIKE
Filed April 26, 1937  2 Sheets-Sheet 1
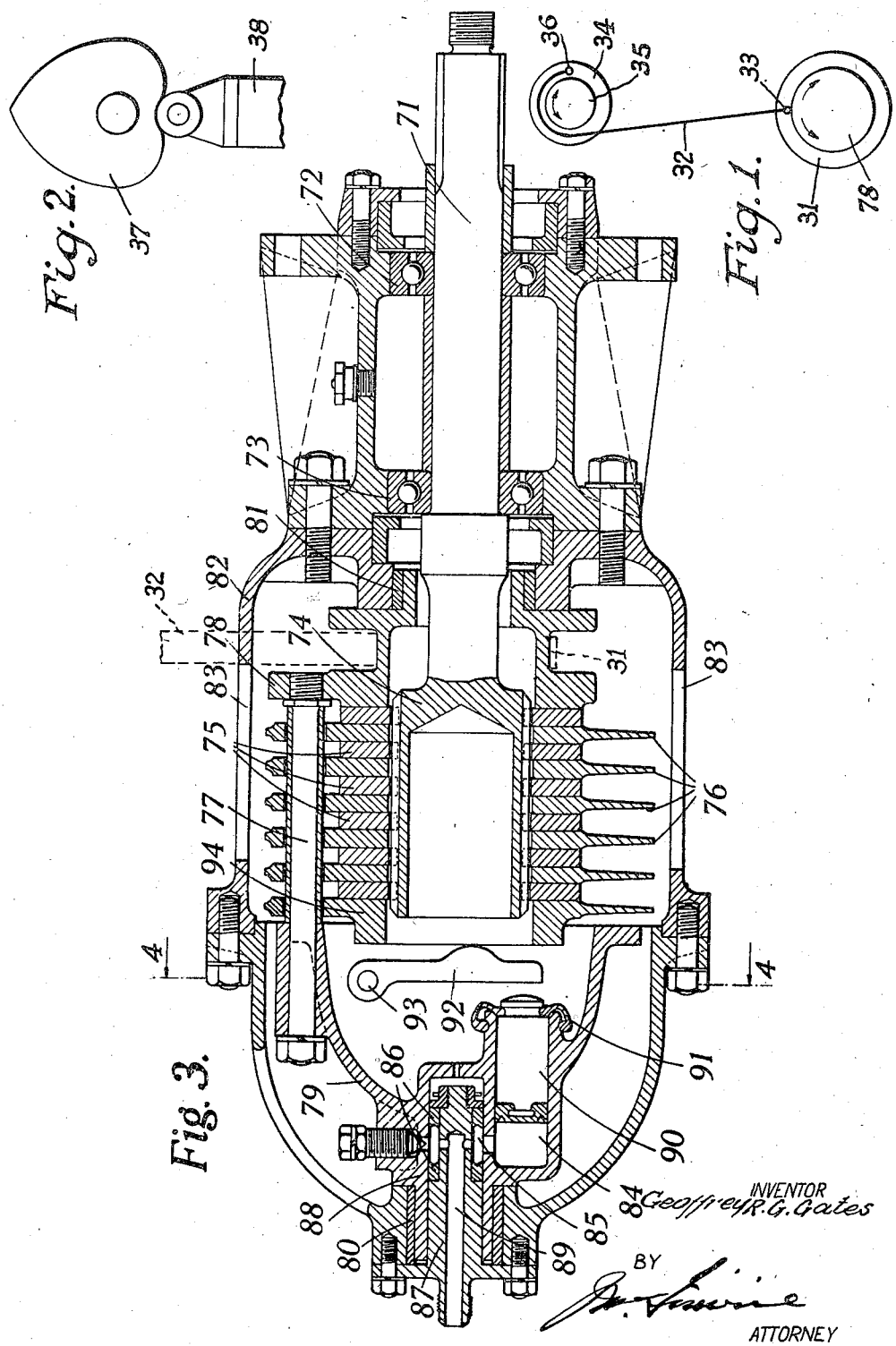
INVENTOR
Geoffrey R. G. Gates
BY
ATTORNEY July 18, 1939. G. R. G. GATES 2,166,586
SERVO-BRAKE MECHANISM FOR VEHICLES AND THE LIKE
Filed April 26, 1937 2 Sheets-Sheet 2
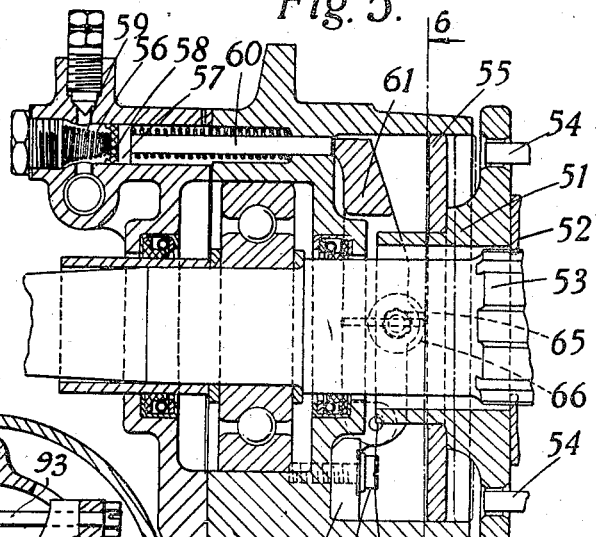
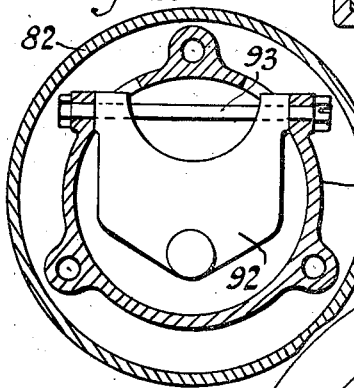
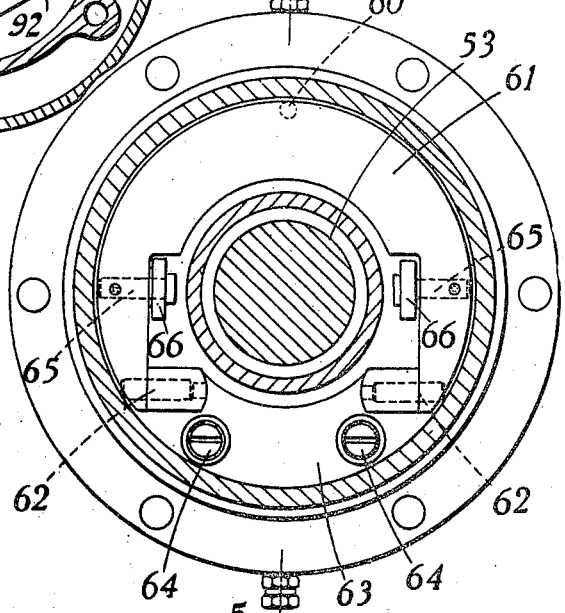
INVENTOR
Geoffrey R. G. Gates
BY
ATTORNEY Patented July 18, 1939

2,166,586

UNITED STATES PATENT OFFICE 2,166,586

SERVO-BRAKE MECHANISM FOR VEHICLES AND THE LIKE

Geoffrey Robert Greenbergh Gates, London, England, assignor of one-half to Automotive Products Company Limited, London, England Application April 26, 1937, Serial No. 139,078
In Great Britain May 7, 1936

7 Claims. (Cl. 188—140)

This invention relates to servo brake mechanism for vehicles and the like of the type in which energy for operating the brakes is derived from some continuously rotating part of the power transmission system of the vehicle which rotates with the driven road wheels or which rotates with the engine. Hitherto it has in practice been found necessary, in order to maintain the working temperatures of the friction surfaces within reasonable limits, to rotate continuously the driven member or members of the servo motor or clutch employed in such mechanism at a speed considerably lower than that of the part from which it derives its motion, reduction gear being employed for this purpose.

The present invention has for an object to avoid the necessity for the employment of reduction gear or at least to enable a high ratio gear to be used; to provide an improved servo motor or clutch of the friction type for use in servo brake mechanisms of the type referred to, the driven member or members of which may run at the same speed as, or at a speed but slightly less than, that of an existing, e. g., road wheel driven or engine driven, part, without undue temperature rise of the friction surfaces; and to provide a simple and robust construction of servo clutch which shall be inexpensive to manufacture and reliable in use.

According to the invention, in a servo brake mechanism of the type referred to the servo clutch has two sets of plates, the plates of one set being of substantially greater diameter than those of the other, and the outer parts of the first set of plates serve as cooling fins for the radiation of heat generated within the device.

Preferably, these outer parts of the first set of plates are utilized for connecting the plates of this set to rotate as one, the plates of the other set being in splined or equivalent relationship with a shaft extending concentrically therethrough, these latter plates being, in general, the driving plates of the device.

Owing to the effective cooling afforded by the outer parts of one set of plates which will be formed preferably of metal the smaller diameter or driving plates may be in splined or equivalent relationship with the propeller shaft of a vehicle or with a shaft running at the same speed as, or at a speed but slightly less than, that of the propeller shaft.

The invention is illustrated in the accompanying drawings, in which:

Figure 1 shows more or less diagrammatically an arrangement for transmitting an effort from a servo clutch to a brake actuating member in accordance with the invention.

Figure 2 is a similar view showing a modified arrangement.

Figure 3 shows a form of clutch and cooperating parts constructed in accordance with the invention.

Figure 4 is a section on line 4—4 of Figure 3.

Figure 5 is a broken view in longitudinal section, partly in elevation, of clutch operating means, the line of section being on line 5—5 of Figure 6.

Figure 6 is a section on line 6—6 of Figure 5.

As shown in Figures 3 and 4, a shaft 71, which may be driven from the propeller or other shaft of a vehicle to which the device is fitted, extends through bearings 72, 73 and carries on an enlarged overhanging portion 74 thereof two sets of clutch plates, one set 75 being of smaller diameter than those 76 of the other set, the plate 75 being in splined relationship with the enlarged portion 74 of the shaft 71 and the outer parts of the plates 76 being formed as cooling fins and having extending therethrough a number of rods, one of which is indicated at 77, which connect said plates 76 to move angularly as one with one another, with a driven member 78, and with a casing 79; this assembly comprising the parts 79, 77 and 78 being journalled in bearings 80 and 81 in a stationary casing, indicated generally at 82. The casing 82 will be cut away, as indicated at 83 to allow air to circulate freely over the outer cooling fin portions of the plates 76. The casing 79 has formed integrally therewith a slave cylinder 84 receiving fluid from an annular space, indicated at 85, between two glands 86 which are located between a fixed spigot 87 and the cylindrical portion 88 of the casing 79; this fixed spigot 87 being formed with a coaxial bore 89 from which radial bores extend to the annular space 85. A piston 90 in the sleeve cylinder 84 is located resiliently in an axial direction by a washer 91 engaging in a peripheral groove in the piston 90, and also in a peripheral groove in the outer wall of the cylinder 84, and this piston co-operates with the lower part of a rocker 92 fulcrummed on a rod 93 carried by the rotary casing 79. When liquid is introduced into the cylinder 84 the piston 90 co-operates with the rocker 92 at one side thereof and brings it to bear at its other side against an end driven clutch member 94 which is thickened to act as a thrust member. It will be seen that with this construction, involving a swivel or rotary liquid connection to a slave cylinder moving with the driven clutch plates, the use of ball bearing or other means for transmitting the clutch-engaging thrust from a non-rotary member to a rotary member is avoided. Although in the arrangement just described an angularly movable or rotary liquid connection co-axial with the clutch plates is employed it will be apparent that, inasmuch as the driven clutch plates do not ever rotate continuously, a flexible conduit or hose may be used to establish liquid connection with the slave cylinder which moves with the driven clutch plates.

In cases where a rocker, such as 61 of Figures 5 and 6 and 92 of Figures 3 and 4, is employed it is desirable with a view to ensuring that this rocker arrangement shall always be effective in preventing the undesirable oscillatory or swash plate movement of the clutch plates that the effort should be applied to this rocker and that the rocker should be connected with the load at different distances from its fulcrum such that there will always be a substantial reaction at said fulcrum. Preferably, the arrangement is such, as shown in the drawings, that the magnitude of the reaction of the fulcrum will be of the same order as that of the force applied to the load by the rocker and of the effort applied to the rocker. This substantial reaction at the fulcrum of the rocker prevents any slight vibratory movement thereof about an axis transversely of the fulcrum which would be possible even where the pivoting or fulcruming of the rocker is carried out with very small clearances. Any clearance at the fulcrum is, so to speak, nullified or rendered incapable of permitting such vibration by the substantial reaction at the fulcrum. It will be further noted that as a material and important construction in preventing undesirable oscillatory or swash plate movement of the clutch plates that the fulcrum length by which the rocker level 61 is supported is at least substantially equal to or of the order of the distance between the points (rollers 66) at which the rocker lever applies pressure to the clutch plates.

For imparting an effort from the servo clutch to a brake-actuating member, such as the piston of the master cylinder of hydraulic or fluid pressure operated brakes, or a member of the rigging or linkage of mechanically applied brakes, the driven clutch member 78 or carrier of Figure 3 is formed with a circumferential groove 31 and one end of a roller chain or other flexible member, indicated at 32, is anchored thereto by a pin 33 (Figure 1) extending across the groove 31, and this chain or other flexible member 32 lies at its other end within a groove 34 of an axially fixed nut 35 to which it is anchored by a pin 36 similar to the pin 33. This nut 35 is in threaded relationship with a non-rotatable but axially movable thrust member (not shown) constituting or cooperating with a brake-actuating member to which latter brake-applying movement is imparted by rotation of the nut 35 in the direction of the arrow (Figure 1), and it will be seen that such rotation is imparted to the nut 35 by angular movement of the driven clutch member 78 in either direction. Alternatively (see Figure 2) a driven clutch member, such as 78 (Figure 3) may be formed as a cam 37 having a follower 38 which transmits motion to a thrust member or brake-applying member (not shown). Here again it will be seen that motion in the same direction is imparted to the latter member by angular movement of the cam clutch member 37 in either direction.

The light engagement and consequent drag of the clutch mentioned above insures that in the case of Figure 1 the chain or flexible member 32 shall be taut, or in the case of Figure 2, that the cam 37 shall always be pressing lightly upon the follower 38 irrespective of whether a vehicle to which the brake mechanism is fitted is traveling forwardly or rearwardly, and so insures also that immediately proper engagement with the clutch is brought about the brake-actuating member will be shifted, thus avoiding any time lag in the application of the brakes which might otherwise be occasioned by the tightening of the chain or flexible member 32 (Figure 1) or by the cam 37 of Figure 2 being brought into firm engagement with the follower 38.

To avoid oscillation of the clutch plates, means may be employed such as shown in Figures 5 and 6 of the drawings. This means includes a thrust member 51 which cooperates with the outer driving clutch plate, indicated at 52, splined upon a shaft 53 and into which rods, indicated at 54, connecting the driven clutch plates (not shown) extend, may carry a bearing member 55 through which clutch-engaging pressure is transmitted to the thrust member 51. In this case, a single slave cylinder 56 containing a piston 57, cup washer 58, and spring 59 is located some distance from the bearing member 55 and thrust member 54, and there is disposed between the bearing member 55 and the piston 57 a thrust rod 60 and an inverted U-shaped rocker 61 straddling the shaft 53. This rocker 61 is pivoted at the ends of its links by pins 62 extending inwardly from the latter into bores formed to receive them in a plate 63 retained in position by studs 64 and carries on two further pins 65 a pair of rollers 66 which cooperate with the bearing member 55. The thrust rod 60 cooperates with the rocker 61 at the top thereof. It will be seen that as the piston 57 is moved by the introduction of liquid under pressure into the cylinder 56, the rocker 61 will be rocked about the pins 62 as fulcrum and will bring the rollers 66 to bear upon the bearing member 55 at opposite sides of the latter.

What I claim to be new is:

1. A servo brake mechanism of the type referred to, including a multiple plate clutch comprising one set of plates rotatable with a shaft extending concentrically therethrough, a second set of plates, a driven carrier to which the second set of plates are connected, the plates of one set being of substantially greater diameter than the plates of the other set and constituting at their outer parts cooling fins for dissipating the heat generated in the clutch, fluid pressure means for engaging said sets of plates to impart an angular movement to the carrier, and means for utilizing such angular carrier movement to apply the brakes of the vehicle, the fluid pressure engaging means including a rocker lever fulcrummed about an axis transversely to that of the clutch and operating to transmit engaging pressure to the clutch plates.

2. A servo brake mechanism as defined in claim 1, wherein both sets of clutch plates are concentric with and surround the shaft, one set of such clutch plates having splined connection with the shaft.

3. A construction as defined in claim 1, wherein the fluid pressure engaging means includes a single slave cylinder responsive to fluid pressure and acting on the rocker lever.

4. A construction as defined in claim 1, wherein the fulcrum of the rocker lever is less distant from the point at which the rocker lever applies pressure to the clutch than the latter point is from the point at which operating pressure is applied to the rocker lever, whereby the reaction at the fulcrum of the rocker lever is not less than the effort applied to the clutch.

5. A construction as defined in claim 1, wherein the rocker lever is substantially of U-shape, is fulcrummed at the ends of its limbs, and straddles the shaft on which the clutch plates are mounted.

6. A construction as defined in claim 1, wherein the fluid pressure engaging means includes a slave cylinder and wherein said slave cylinder is carried by a casing movable as a unit with the driven clutch plates and means for admitting a source of liquid under pressure to the slave cylinder.

7. A servo brake mechanism including a driven shaft, a multi-plate clutch mounted on the shaft, one set of plates having splined relation to the shaft and the other set of plates being free of but concentric with the shaft, a carrier connected to and movable with the plates free of the shaft, a slave cylinder mounted in the carrier, and a rocker lever arranged between the slave cylinder and clutch plates and acting in the operation of the slave cylinder to exert clutching pressure between the respective sets of plates, a fixed conduit for the admission of fluid under pressure, a chamber surrounding and open to the conduit, and a communication between the chamber and the slave cylinder to maintain constant fluid pressure service to the slave cylinder.

GEOFFREY ROBERT GREENBERGH GATES.